US008589558B2

(12) United States Patent
Peles et al.

(10) Patent No.: US 8,589,558 B2
(45) Date of Patent: Nov. 19, 2013

(54) METHOD AND SYSTEM FOR EFFICIENT DEPLOYMENT OF WEB APPLICATIONS IN A MULTI-DATACENTER SYSTEM

(75) Inventors: Amir Peles, Tel Aviv (IL); Shy Marom, Ramat Hasharon (IL)

(73) Assignee: Radware, Ltd., Tel Aviv (IL)

( * ) Notice: Subject to any disclaimer, the term of this patent is extended or adjusted under 35 U.S.C. 154(b) by 154 days.

(21) Appl. No.: 13/103,488

(22) Filed: May 9, 2011

(65) Prior Publication Data

US 2012/0136697 A1 May 31, 2012

Related U.S. Application Data

(60) Provisional application No. 61/417,592, filed on Nov. 29, 2010.

(51) Int. Cl.
*G06F 15/173* (2006.01)

(52) U.S. Cl.
USPC .......................................................... 709/226

(58) Field of Classification Search
USPC ................................................. 709/223, 226
See application file for complete search history.

(56) References Cited

U.S. PATENT DOCUMENTS

| | | | |
|---|---|---|---|
| 2002/0194324 A1 | 12/2002 | Guha | |
| 2004/0117476 A1 | 6/2004 | Steele et al. | |
| 2008/0183544 A1 | 7/2008 | Matsumitsu et al. | |
| 2009/0132699 A1 | 5/2009 | Sharma et al. | |
| 2009/0300210 A1 | 12/2009 | Ferris | |
| 2009/0313273 A1* | 12/2009 | Wexler et al. | 707/100 |
| 2010/0050172 A1 | 2/2010 | Ferris | |
| 2010/0064035 A1* | 3/2010 | Branca et al. | 709/221 |
| 2010/0131324 A1 | 5/2010 | Ferris | |
| 2010/0223217 A1 | 9/2010 | Little | |
| 2010/0228819 A1* | 9/2010 | Wei | 709/203 |
| 2011/0202925 A1* | 8/2011 | Banerjee et al. | 718/104 |
| 2011/0270804 A1* | 11/2011 | Hadar et al. | 707/684 |

* cited by examiner

*Primary Examiner* — Jason Recek

(74) *Attorney, Agent, or Firm* — Myers Wolin, LLC

(57) ABSTRACT

A system for computing an optimal deployment of at least one web application in a multi-datacenter system comprising a collector for collecting performance measurements with regard to a web application executed in the multi-datacenter system and grouping the performance measurements according to locations of a plurality of clients accessing the web application; a data repository for maintaining at least a performance table including at least the performance measurements grouped according to the plurality of client locations and a service level agreement (SLA) guaranteed to clients in the plurality of client locations; and an analyzer for processing at least information stored in the performance table for generating a recommendation on an optimal deployment of the web application in at least one combination of datacenters in the multi-datacenter system by computing an expected SLA that can be guaranteed to the clients in each combination of datacenters.

42 Claims, 6 Drawing Sheets

METHOD AND SYSTEM FOR EFFICIENT DEPLOYMENT OF WEB APPLICATIONS IN A MULTI-DATACENTER SYSTEM

CROSS-REFERENCE TO RELATED APPLICATIONS

This application claims the benefit of U.S. provisional application No. 61/417,592 filed on Nov. 29, 2010, the contents of which are herein incorporated by reference.

TECHNICAL FIELD

This invention generally relates to deployment of web applications and web services in datacenters.

BACKGROUND OF THE INVENTION

The number of organizations and enterprises that expose their business information and services on the Internet has rapidly increased. Online banking and shopping services are merely a couple of examples for popular web applications. Web applications, or services, are facilitated through a datacenter, which typically, as illustrated in FIG. 1, includes web servers 110, an application delivery controller (ADC) or a load balancer 120, application servers 130, and one or more backend systems 140. Users of clients 150 submit their requests to the web servers 110 through a network 170, such as the Internet.

The ADC 120 distributes clients' 150 requests between the web servers 110 to balance the load. The application servers 130 are often responsible for running the business logic layer of the application and for interacting with various enterprise-wide resources, such as the backend systems 140. The backend systems 140 may include, for example, a database server and a legacy system. Typically, the backend systems 140 operate and respond to requests sent from the clients 150 and forwarded by the application servers 130.

Multi-datacenter systems have been introduced to ensure, in part, scalability and redundancy for web applications. An example for such a system 200 is illustrated in FIG. 2, where 3 datacenters 210-1, 210-2, and 210-3 serve clients 220 through a network 230. Typically, each datacenter is deployed in a different geographic location (site).

The ADC 211 deployed in each datacenter 210 redirects clients' 220 requests to a datacenter that would best serve such requests. Typically, the redirection decision is based on the location of the client. With this aim, an ADC 211 collects "network proximity" information about clients 220 to be used in the distribution decisions. Such information mainly pertains to a location of a client and its network distance from a respective datacenter 220-$i$. The network proximity information may include static proximity and dynamic proximity details. The static proximity relies on predefined IP-to-location definitions, while the dynamic proximity is based on information collected from the clients 210 by active probes. The probing is performed from one or more datacenters 210, at the same time, to evaluate the network distance (e.g., as a number of router hops) and a round-trip time (RTT) of packets sent from a client 220 to an ADC 211 or vice versa. The data from the probes is consolidated into a proximity database that is usually shared by all ADCs 211 in all the datacenters to maintain a unified and consistent view of client proximity. When a client 220 sends a request to one of the datacenters 210, the ADC 211 of the respective datacenter utilizes the network proximity information and other preferences to decide which of the datacenters 210 should handle the client's 210 request.

Typically, datacenters are expected to meet quality of service (QoS) and quality of experience (QoE) requirements as well as service level agreements (SLAB) when executing an application. Thus, there is a need to monitor transactions in order to prevent situations of, for example, unpredictable levels of service and uncontrolled user experience. One of the factors that determine the QoE is the application responsiveness, i.e., the amount of time that a transaction is completed. That is, the amount of time it takes from when the user sends the request (e.g., clicked on a link or button) to the time that a complete response is received and displayed. The less time it takes, the better the experience is.

The amount of time that it takes to complete a transaction (hereinafter the transaction time (TT)) can be divided into two parts: 1) the time that packets travelled through the network 230, hereinafter the network transaction time (NTT); and 2) the amount of time that a server processes the request(s) to produce the result, hereinafter the server transaction time (STT). Thus, the TT can be computed as follows:

$$TT=NTT+STT.$$

In the related art, there are tools to measure the NTT and the STT. Such monitoring tools further indicate problems, and provide solutions for solving them. However, conventional monitoring tools that exist today are operative to monitor the TT, STT and NTT only in the datacenter executing the application to be monitored. For example, if an application APPL_1 is executed over a datacenter 210-1, a monitoring tool can measure the TT, STT and NTT value only with respect to the datacenter 210-1 and provide solutions for improving the performance in the datacenter 210-1. For instance, such solutions would include migrating the application to a different application server in the datacenter 210-1 or adding resources to the datacenter 210-1. There is no current solution that can provide an indication of what would be the QoE if the application APPL_1 would have been executed, e.g., at a datacenter 210-2. Further, there are not existing tools that can recommend on the optimal datacenter in terms of cost, SLA, QoE, and QoS for deploying the application.

It would be, therefore, advantageous to provide a system and method that overcomes the deficiencies of existing monitoring tools.

SUMMARY OF THE INVENTION

Certain embodiments of the invention include a system for computing an optimal deployment of at least one web application in a multi-datacenter system. The system comprises a collector for collecting performance measurements with regard to a web application executed in the multi-datacenter system and grouping the performance measurements according to locations of a plurality of clients accessing the web application; a data repository for maintaining at least a performance table including at least the performance measurements grouped according to the plurality of client locations, the data repository further including a service level agreement (SLA) guaranteed to clients in the plurality of client locations; and an analyzer for processing at least information stored in the performance table for generating a recommendation on an optimal deployment of the web application in at least one combination of datacenters in the multi-datacenter system by computing an expected SLA that can be guaranteed to the clients in each combination of datacenters, wherein the recommendation on the optimal deployment is generated when the computed expected SLA satisfies the SLA guaranteed to the clients.

Certain embodiments of the invention also include a method for computing an optimal deployment of at least one web application in a multi-datacenter system. The method comprises collecting performance measurements with regard to a web application executed in the multi-datacenter system; grouping the performance measurements according to locations of a plurality of clients accessing the web application; maintaining in a data repository at least a performance table including at least the performance measurements grouped according to the plurality of client locations, the performance table further including a service level agreement (SLA) guaranteed to clients in the plurality of client locations; computing using information stored in the performance table an expected SLA that can be guaranteed to the clients in each combination of datacenters; and generating a recommendation on an optimal deployment of the web application in at least one combination of datacenters in the multi-datacenter system based in part on the computed expected SLA, wherein the recommendation on the optimal deployment is generated when the computed expected SLA satisfies the SLA guaranteed to the clients.

Certain embodiments of the invention also include a multi-datacenter system. The multi-datacenter system comprises a plurality of datacenters for executing at least one web application, wherein a plurality of clients access the at least one web application from different locations through a network; each datacenter includes a probing module for measuring a round-trip time (RTT) from the datacenter to each client location of the plurality of client locations; at least one of the datacenter includes a transaction time (TT) measuring module measuring a response time of a web application and an advisory unit for recommending an optimal deployment of the web application in a combination of datacenters in the multi-datacenter system based in part on an expected service level agreement (SLA) that can be guaranteed to the clients in each combination of datacenters in the multi-datacenter system, wherein the recommendation on the optimal deployment is generated when the expected SLA satisfies the SLA guaranteed to the clients.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
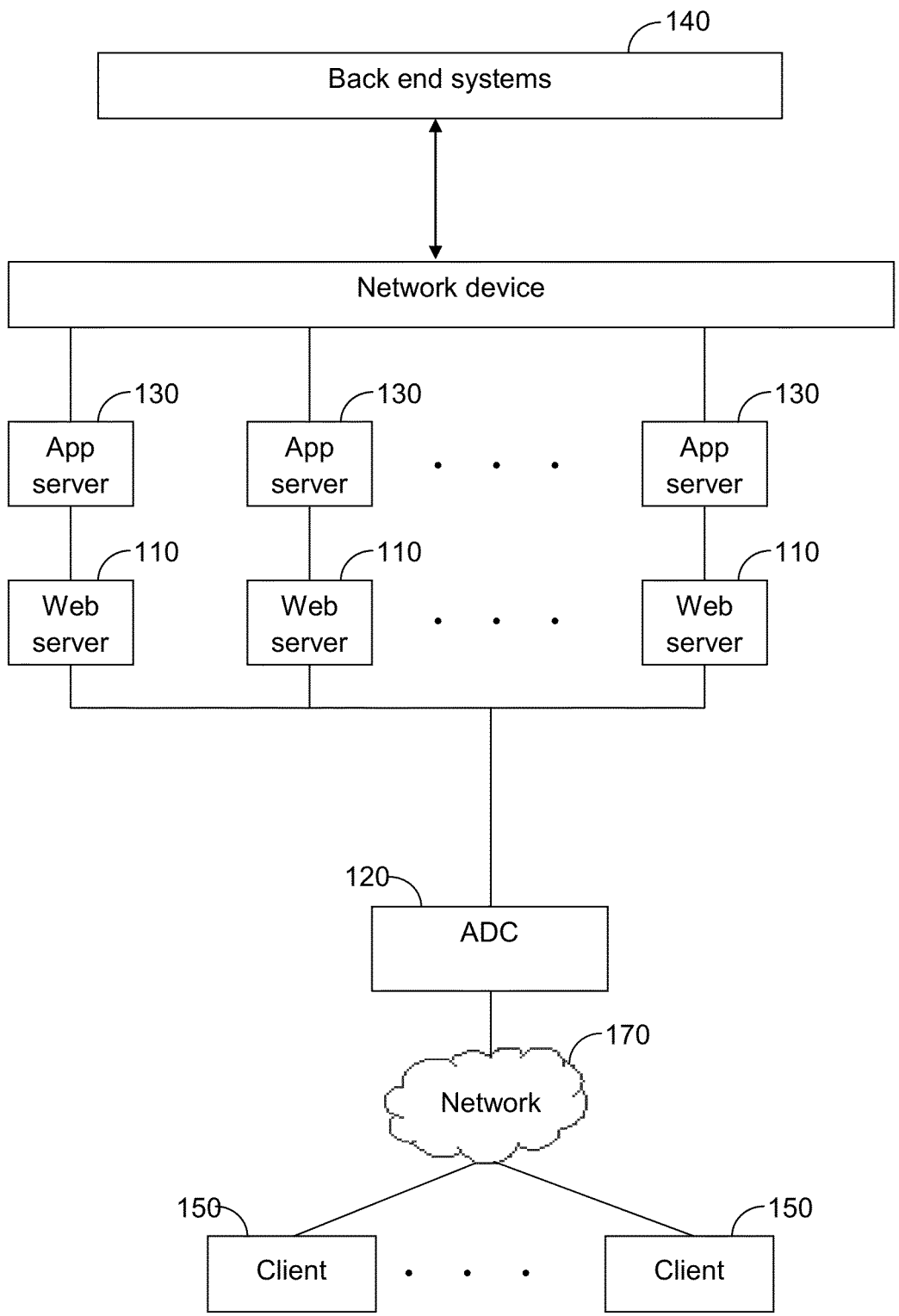
FIG. 1 is a diagram of a conventional datacenter service deployment in a multi-datacenter system.
Figure 2:
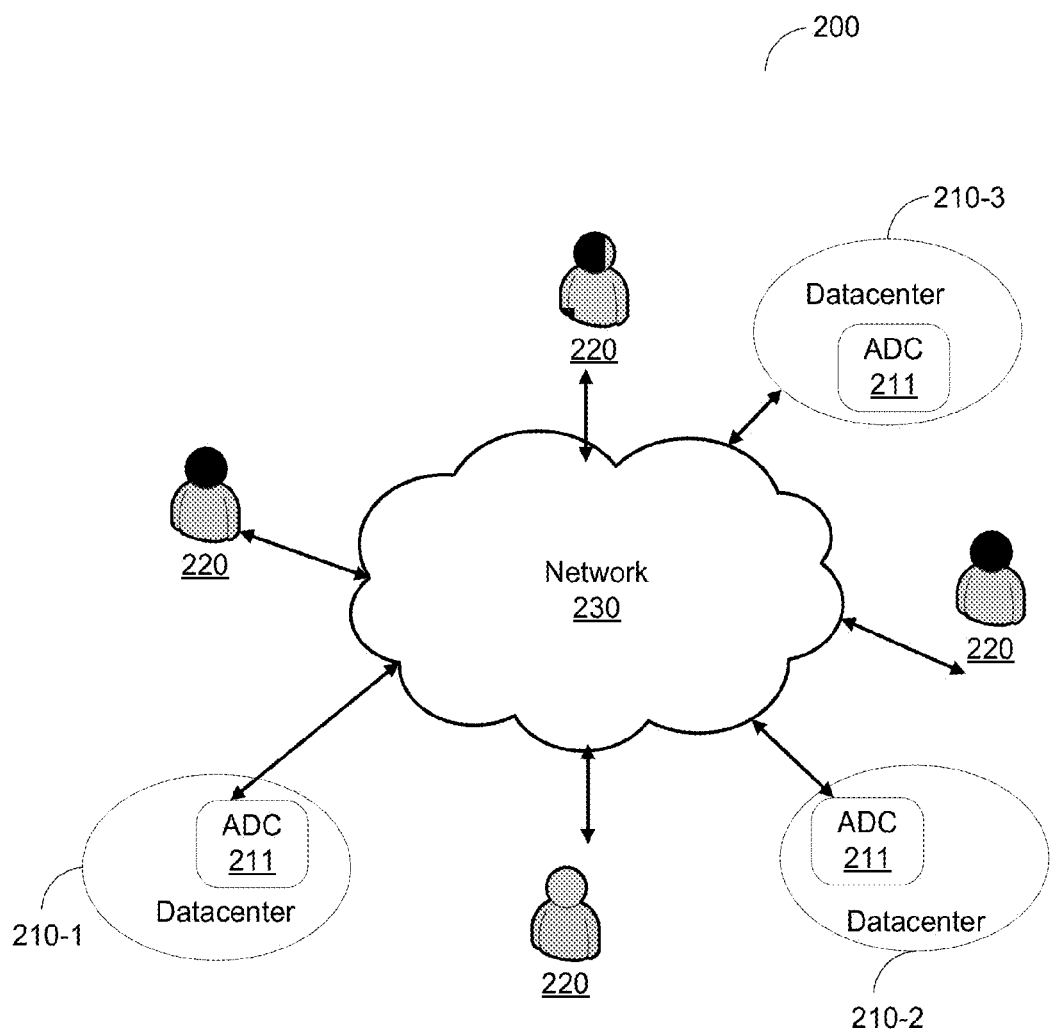
FIG. 2 is a diagram of a conventional multi-datacenter system.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
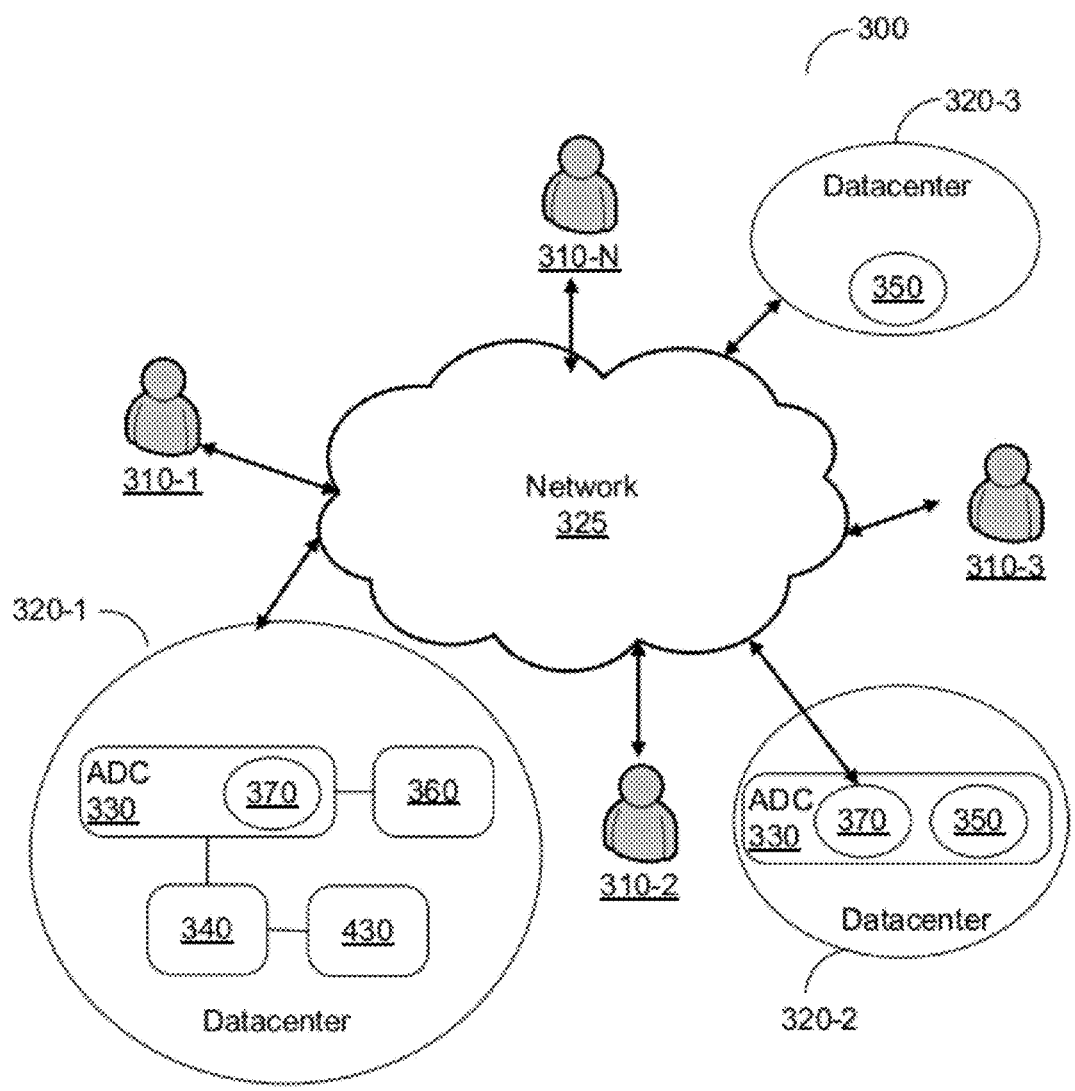
FIG. 3 is a diagram of a multi-datacenter system arranged in accordance with an embodiment of the invention.

FIG. 3 shows an exemplary diagram of a multi-datacenter system 300 in accordance with an embodiment of the invention. A plurality of users of clients 310-1 through 310-N can access, through a network 325, web applications executed over one or more datacenters 320-1, 320-2, and 320-3 each of which may be advantageously located at a different geographic location (site). A web application is a software application accessed over the network and in the context of the present invention also includes a web service. A client 310 may be, but is not limited to, a PC, a smartphone, a mobile phone, a tablet computer, a netbook computer, and the like. The client 310 runs a software application, (e.g., a browser) and an operating system (e.g., Windows, Android, Linux, etc.) for accessing resources of the datacenters.

In accordance with an exemplary embodiment of the invention, one or more of the datacenters in the system 300 includes an advisory unit 340. In the non-limiting diagram shown in FIG. 3, the advisory unit 340 is connected to an ADC 330 in the datacenter 320-1. The advisory unit 340 is designed, in part, to optimize the monetary costs of all datacenters in the system 300 while maintaining the service level guaranteed to users. Specifically, the advisory unit 340 generates recommendations on which datacenters' web applications should be deployed, whether or not the resources of a datacenter should be reconfigured (e.g., remove/add servers), whether a complete datacenter should be added or removed, and so on. As will be described in detail below the recommendations of the advisory unit 340 are based at least on the location of a client 310 accessing an application, fixed and usage costs associated with executing the application in a datacenter, available capacity of the datacenter, and response time of the application. To the advisory unit 340 a configuration unit 430 may be connected for causing the deployment of the application in a multi-datacenter system based on recommendations provided by the advisory unit 340. In certain exemplary embodiments, the configuration unit 430 may be integrated in the advisory unit 340.

The RTT is measured using probing modules (probes) 350 operable in each datacenter that executes the web application to be monitored or datacenter that can potentially run the web application. A probe 350 measures the RTT between clients 310 and datacenter 320 at a packet-by-packet level or at a complete transaction level. In addition, a probe 350 can measure the percentage of packet retransmissions and the variance of multiple measurements. High variance or high retransmission rate can indicate low quality of communication. In an exemplary embodiment of the invention, the probes 350, under the control of the advisory unit 340, measures one or more of the RTT, retransmission rate, and variance of such measurements between datacenters 320 and clients 310 that access the application. The clients can be made to initiate and send dummy requests to the probes 350 which use the requests to measure the RTT. The clients are a group of clients 310 selected by the system 300 based on, for example, their locations. As an alternative, the probes 350 can initiate requests to the clients 310 for the same measurements.

The probe 350 may be part of the advisory unit 340, an ADC 330 (e.g., in a datacenter 320-2), or a standalone device (e.g., in a datacenter 320-3). In the non-limiting system 300, it is assumed that an application to be monitored is executed by the datacenters 320-1 and 320-2, where the datacenter 320-3 may potentially run the application.

A TT measuring module 360 provides a real response time of an application to a client by measuring the STT and NTT in a datacenter executing the application. The module 360 monitors and analyzes the network traffic of real user transactions sent to the application. In the non-limiting system 300, the TT measuring module 360 is connected to a datacenter 320-1. However, the module 360 may be part of the advisory unit 340, an ADC 330, or a standalone device. Further, the TT measuring module 360 can either be placed inline of traffic (e.g., as part of a networking device that forwards the traffic between the user and the application) or out-of-path (e.g., by tapping the traffic). The TT measuring module 360 can monitor all transactions of client 310 or some of the transactions according to predefined conditions set by the operator of the system 300.

The system 300 further includes redirection modules 370 installed in datacenters where the application to be monitored is deployed. In the non-limiting diagram shown in FIG. 3, redirection modules 370 are placed in datacenters 320-1 and 320-2. A redirection module 370 receives a request from a client 310 and decides whether to redirect the request to another datacenter or locally serve the request. Each redirection module 370 also collects statistics regarding the different user locations and the relative load they generate. In addition, the redirection module 370 monitors the aggregated load of user transactions compared to available capacity and other resource availability in a datacenter (e.g., computing resources, storage resources, bandwidth, etc.). The redirection module 370 is part of the ADC 330.

Although illustrated as a multi-datacenter deployment, it should be appreciated that the system 300 may be a cloud computing system where a web application can virtually be executed in different locations. A cloud computing system may include one or more private clouds, one or more public clouds, or a combination thereof. Thus, the teachings of certain embodiments of the invention can be also utilized to determine the optimal cloud location, in terms of at least cost, QoE, SLA and QoS, for deploying an application.

Figure 4:
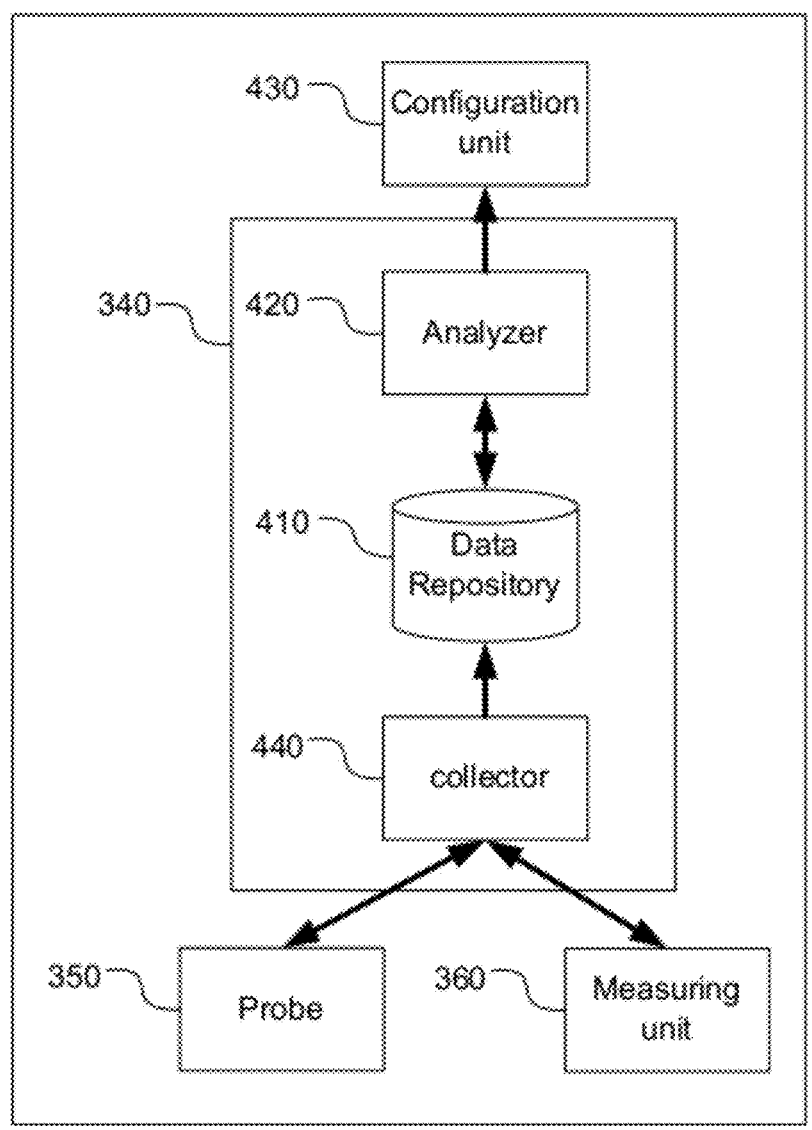
FIG. 4 is a block diagram of an advisory unit implemented in accordance with one embodiment of the invention.

FIG. 4 shows a non-limiting and exemplary block diagram of the advisory unit 340 constructed in accordance with an embodiment of the invention. The advisory unit 340 includes a data repository 410, an analyzer 420, a configuration unit 430, and a collector 440 for interfacing with the network and/or the various modules connected to the unit 340.

The collector 440 receives RTT measurements from the probes 350, TT measurements from the TT measuring modules 360, and statistics information gathered by the redirection modules 370. Further, the collector 440 groups the received data according to the locations of clients 310. The location can be determined by the operator of the system 300 as geographical regions (e.g., city, country, list of countries and continent) or network ranges (e.g., IP address ranges or subnets). The IP address of each client can be linked to the geographic location by publicly available geographic IP databases. The collector 440 stores the gathered data in the data repository 410.

The advisory unit 340 is set with SLA guarantee parameters (GSLA) which are also saved in the data repository 410. The SLA guarantee parameters may include the maximal acceptable TT (MAT) for clients of the application in all locations or in major locations. The SLA guarantee parameters may further include a maximal percentage of clients that may experience breach of the maximal acceptable TT over a defined period. The SLA guarantee parameters may further include quality parameters like maximal allowed packet loss and packet retransmission rates, and a maximal allowed variance of the TT measurements. Crossing these levels of quality is regarded as a breach of the SLA guaranteed to the clients of the application and requires remapping of resources in order to provide the SLA. The clients 310 themselves may differ in SLA settings according to location or type of client machine. For example, different SLA levels can be defined for clients in specific networks (defined by geographical location or IP address ranges), and for clients that the system 330 identifies as mobile clients.

The data repository 410 can also extrapolate TT values according to the real transaction characteristics to determine the projected TT value of each client location/datacenter. For each client's 310 location, the data repository 410 maintains, per actual or candidate datacenter 320, the average NTT, the projected TT (after adding the measured STT in one of the sites to the NTT/RTT measurement of the client's location) and a usability indicator (UI). The projected TT values together with the RTT values allow computing the expected SLA of an application if executed in a particular datacenter.

The UI considers the measurements and the SLA guarantee parameters to identify locations that would not be able to deliver the guaranteed SLA from a certain datacenter 320. For example, a UI value is set to '1' if a projected (extrapolated) TT value for a certain location is below the maximal acceptable TT; and set to '0' when the projected TT value is above the maximal acceptable TT. In cases where the retransmission rate (R) and variance (V) are associated to the RTT measurements, the data repository 410 compares such values to the guaranteed SLA parameters when determining the usability indicator (UI). For example, when a measured TT is associated with a high variance value or a high retransmission rate over the SLA guarantee parameters, the UI is set to '0'. When the UI indicates '0' for a combination of a datacenter 320 and a client location 310, the datacenter is not fit to serve that location.

For each datacenter 320, the operator defines at least one of a fixed cost (FC) and a usage cost (UC). The fixed cost is the cost associated with starting and maintaining a web application on a datacenter. That cost includes operation and management cost that is not related to the amount of clients that are receiving service from the datacenter 320. The usage cost is the expected cost from bandwidth usage, computation resource usage and storage usage at the new datacenter in relation to the number of clients receiving service from the datacenter. Each datacenter can also be assigned with a preference coefficient (PC) that indicates a general preference for using a particular datacenter and a maximum capacity (MC) variable. The maximum capacity variable may be a combination of one or more of the following: capacity parameters for computation resources, available memory and storage, and available bandwidth in each of the datacenters 320. This variable may limit the ability to scale resources allocated to a service/application indefinitely.

In addition, there may be a limit on the redirection capacity (RC) of a redirection unit 370 in order to cap the amount of traffic that can be redirected between datacenters 320. The redirection capacity (RC) may be determined based on one or more of the following values: an available bandwidth, concurrent connections, and transactions per second available at each datacenter. In addition, each client's location 310 is assigned with a dynamic weight (W), which is computed based on the amount of transactions generated by users in each location. Following is an exemplary and non-limiting table illustrating how the data is arranged in the data repository 410.

TABLE 1

| | Datacenter 320-1 ($FC_1$, $UC_1$, $PC_1$, $MC_1$, $RC_1$) | | | | Datacenter 320-2 ($FC_2$, $UC_2$, $PC_2$, $MC_2$, $RC_2$) | | | | Datacenter 320-j ($FC_j$, $UC_j$, $PC_j$, $MC_j$, $RC_j$) | | | |
|---|---|---|---|---|---|---|---|---|---|---|---|---|
| | TT | V | R | UI | TT | V | R | UI | TT | V | R | UI |
| $Location_1$ ($W_1$, $GSLA_1$) | | | | | | | | | | | | |
| $Location_2$ ($W_2$, $GSLA_2$) | | | | | | | | | | | | |
| ... | | | | | | | | | | | | |
| $Location_n$ ($W_n$, $GSLA_n$) | | | | | | | | | | | | |

The information stored in the data repository 410 is aggregated during a learning period, which may be set to a predefined period of time or until sufficient data is available. In addition, the content of the data repository 410 may be dynamically updated as new measurements are provided or the costs are changed. For example, an operator may periodically initiate a process for updating the content stored in the data repository 410.

The analyzer 420 is triggered to process data stored in the repository 410 either manually (e.g., by the system's operator) or automatically (e.g., when measured TT and/or RTT values are below a threshold). The analyzer 420 carries out an optimization process, an example of which is provided below, and outputs recommendations to the configuration unit 430 or to an external entity, such as the system administrator or orchestration system. The recommendations are based, in part, on the TT, V, R, UI, and W values of each client location and the FC, UC, PC, MC, RC values associated with each datacenter. The recommendations may include, but are not limited to, in which datacenter or combination of datacenters to deploy the application, which resources of the datacenter(s) should be allocated or deallocated to serving the application, whether to add or remove an application from a datacenter(s), and whether to add or remove redirection capacity for the application in the redirection modules 370. The recommendations can further suggest scheduled increase and decrease of application resources in specific datacenters according to detected usage patterns in the various user locations, to the point of shutting down all of a datacenter's resources when they are not needed. The recommendation may point to alternative datacenters to reduce costs or improve response time. Other recommendations can offer ways to reduce costs, while suffering marginally slower response time, by suggesting a different datacenter or a combination of datacenters and computing resource deployment in the datacenters. Yet another approach is to tune the system 300 to achieve the best possible SLA regardless of costs or ignoring some components of the associated costs.

The configuration unit 430, based on the recommendations provided by the analyzer 420, determines if the system 300 should be reconfigured. If so, the configuration unit 430 causes the deployment of the application in the datacenter or combination of datacenters. The configuration unit 430 may also reconfigure one or more of the TT measuring modules 360, probes 350, and redirection modules 370 to ensure that these modules will support changes made in one or more datacenters 320. In one embodiment, the configuration unit 430 can also interact with external entities, such as a system administrator or an orchestration system to approve the configuration modifications or perform configuration actions that are orchestrated throughout the multiple datacenters.

In certain embodiments of the invention, the ADC 330 may include at least one of a probe 350, a TT measuring module 360, and a redirection module 370. In one embodiment of the invention, the ADC 330 may include at least one of a collector 440, a data repository 410, and an analyzer 420. Thus, the ADC 330 operable in the system 300 may utilize information stored in the data repository 410 for redirecting decisions of redirection module 370.

Figure 5:
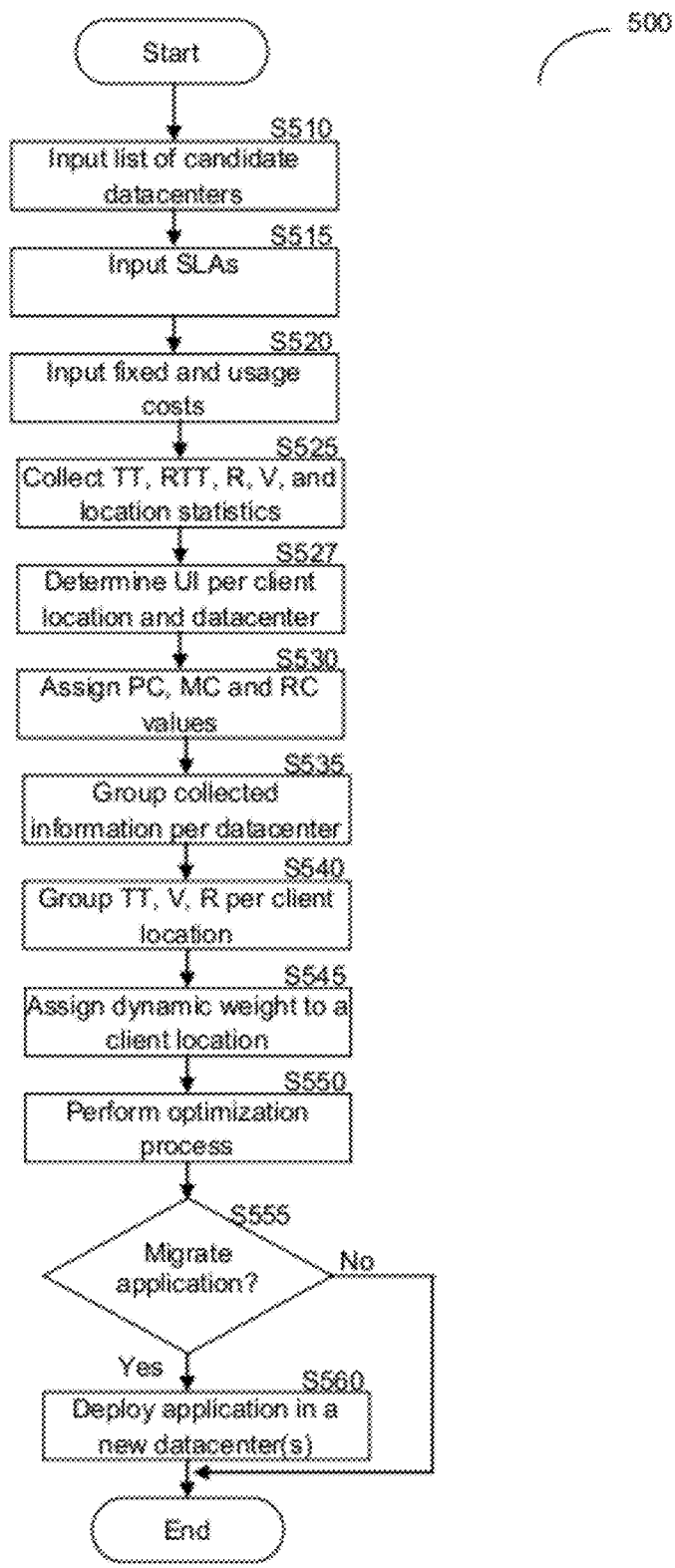
FIG. 5 is a flowchart illustrating a method for efficient deployment of applications in a multi-datacenter system implemented in accordance with an embodiment of the invention.

FIG. 5 shows an exemplary and non-limiting flowchart 500 illustrating a method for efficient deployment of applications in a multi-datacenter system implemented in accordance with an embodiment of the invention. At S510, a list of candidate datacenters 320 where the application can be potentially installed is provided. At S515, the SLA guarantee parameters for users of the application are also input. At S520, a fixed cost (FC) and a usage cost (UC) for installing and using each of the listed candidate datacenters is set, for example, by an operator of the multi-datacenter system. At S525, RTT, TT, retransmission rates (R), and variance (V) measurements as well as statistics regarding clients' locations and loads generated by clients are collected and saved in the data repository 410. As mentioned above, the RTT and TT are measured by the probes 350 and measuring modules 360 respectively. The locations' statistics are gathered by the collector 440 from the redirection units 370 and stored in the data repository 410.

At S527, the usability indication (UI), per client location and datacenter, is computed based on the received measurements and SLA guarantee parameters. At S530 for each candidate datacenter, the preference coefficient (PC), maximum capacity (MC) and redirection capacity (RC) variables are assigned with values to ensure efficient utilization of resources of the datacenter. The MC variable may dynamically change if application resources change, for example, the MC of a datacenter is automatically reduced if a number of application server instances at that datacenter are detected as not operational. At S535, the collected information is grouped per candidate datacenter. At S540, the RTT, TT, V, and R measurements are grouped by each client location, and then, at S545, each client's location is assigned with a dynamic weight (W) that is proportional to the load generated from clients in that location. The result of S535, S540, and S545 is a table, such as the exemplary Table 1 shown above. The table is maintained in data repository 410.

At S550, an optimization process is performed to determine an optimal datacenter or a combination of datacenters for deploying the application based on the information stored in the data repository 410. For example, if an application is being executed over a datacenter 320-1, then the optimization process may recommend running the application in the datacenters 320-3 and 320-2 where each datacenter serves different client locations. At S555, a decision is taken based on the outcome of the optimization process whether or not the application should be deployed in one or more new datacenters (i.e., datacenters that currently do not host the application). If so, at S560, the method causes the deployment of the application in the new datacenter(s) and configuration of the datacenter(s) to support the application. This can be performed by techniques including, but not limited to, application cloning, application migration, application motion, application booting, and the like. If S555 results with a negative answer, execution ends.

Figure 6:
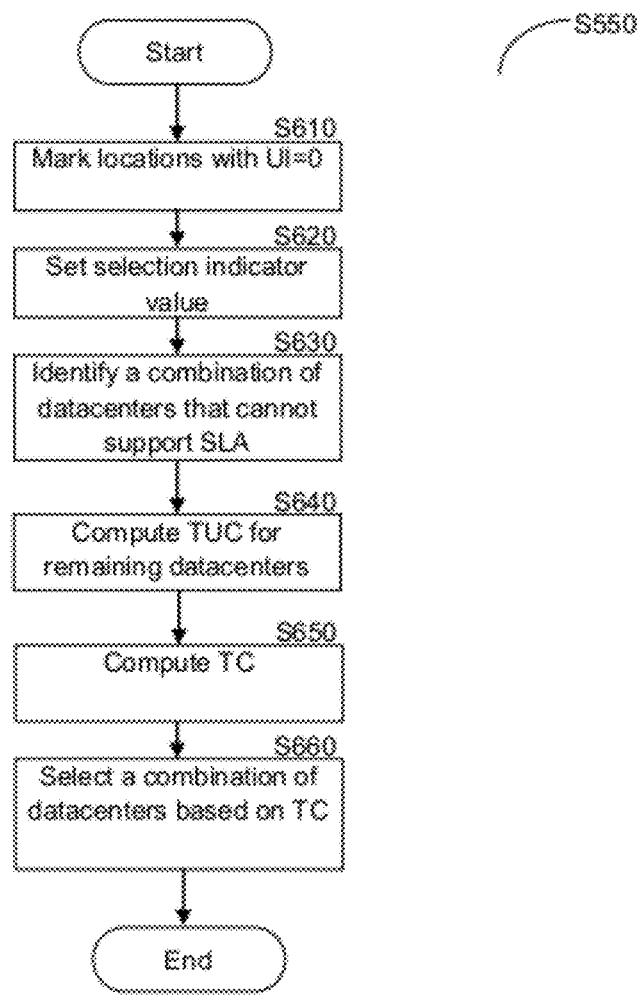
FIG. 6 is a flowchart illustrating an optimization process implemented in accordance with an embodiment of the invention.

FIG. 6 shows a non-limiting flowchart S550 illustrating the optimization process implemented in accordance with an embodiment of the invention. The process analyzes the information stored in the data repository 410, preferably in a format shown in Table 1, to identify the best datacenter or combination of datacenters for deploying a service/application. The output of the process is determined using the required and actual service level for the application, client locations, and the costs of operation in the different data centers in order to find where the service can be expanded at a minimal cost, while maintaining the required service level. For efficient operation of the optimization process, the usability indicator (UI) of each application should be computed as described above.

At S610, client locations associated with a UI value equal to '0' are marked and are not processed. At S620, a value of a selection indicator (SI) is set. Specifically, a client location can be associated with a datacenter or combination of datacenters that can provide the required SLA to that client location. If a datacenter j was selected to serve client location loc, the selection indicator $SI_{loc,j}$ is set to 1; otherwise, $SI_{loc}$ is set to 0.

At S630, the process identifies a datacenter or a combination of datacenters that can provide an adequate service level to all client locations at the lowest cost. With this aim, all possible combinations of datacenters are traversed to determine combinations of datacenters that cannot serve the aggregated amount of user transaction weights at each datacenter due to capacity limits based on a maximum capacity (MC) variable defined for each datacenter. Such combinations of datacenters are removed from further processing. At S640, for the remaining combinations of datacenters, the total usage cost (TUC) for each datacenter that was selected to serve at least one client location is computed. Specifically, the TUC of a specific datacenter j is the sum of the usage cost of a datacenter j ($UC_j$) multiplied by the aggregated weights of client locations ($W_{loc}$) that can serve at the datacenter j and the respective selection indication SI. That is, the TUC can be represented as follows:

$$TUC_j = \sum_{loc=1}^{n} W_{loc} \times UC_j \times SI_{loc,j}$$

At S650, the total cost (TC) of a datacenter j is computed by summing the fixed cost and TUC. That is, $$TC_j = FC_j + TUC_j$$

The total cost of a combination of datacenters is the sum of TC computed for each datacenter in the combination. At S660, the combination of datacenters (which may include a single datacenter) that yields the lowest total cost is selected as the best candidate for deploying the application.

Following is a non-limiting example for the operation of the optimization process described above. In this example, the application can be deployed on 3 datacenters ($DC_1$, $DC_2$, and $DC_3$) and clients can access the application from 4 different locations ($Location_1$, $Location_2$, $Location_3$, and $Location_4$). The maximum acceptable TT derived from the required SLA guarantee parameters is 2 seconds. Further, 50% of the transactions originate from $Location_1$ (i.e., $W_1=50$), 20% from $Location_2$ and $Location_4$, (i.e., $W_2=W_4=20$) while $Location_3$ is responsible for just 10% of the transactions (i.e., $W_3=10$). The usage cost in this example is proportional to serving 1% of the transactions in a selected datacenter. The exemplary fixed cost (FC), usage cost (UC), and total usage cost for each datacenter from each location ($TUC_{loc,j}$) are specified in Table 2 which further shows the TT measurements and the computed UI values.

TABLE 2

| | $DC_1$ (FC = 25, UC = 5) | | | $DC_2$ (FC = 30, UC = 4) | | | $DC_3$ (FC = 20, UC = 6) | | |
|---|---|---|---|---|---|---|---|---|---|
| | TT | UI | $TUC_{loc,1}$ | TT | UI | $TUC_{loc,2}$ | TT | UI | $TUC_{loc,3}$ |
| $Location_1$ (W = 50, MAT = 2) | 1.5 | 1 | 50 × 5 = 250 | 2.5 | 0 | — | 2 | 1 | 50 × 6 = 300 |
| $Location_2$ (W = 20, MAT = 2) | 2 | 1 | 20 × 5 = 100 | 1 | 1 | 20 × 4 = 80 | 3 | 0 | — |
| $Location_3$ (W = 10, MAT = 2) | 1 | 1 | 10 × 5 = 50 | 2.5 | 0 | — | 3 | 0 | — |
| $Location_4$ (W = 20, MAT = 2) | 2.5 | 0 | — | 1.5 | 1 | 20 × 4 = 80 | 1 | 1 | 20 × 6 = 120 |

Analyzing the total costs of relevant datacenter combinations exhibits that no datacenter alone can address the SLA requirement of the application for the client locations. A combination of datacenters $DC_1$, $DC_2$, and $DC_3$ is needed to address the needs of the application and maintain the required service level. There are multiple combinations available for associating client locations with the datacenters:

combination 1: associating locations 1, 2, 3 to $DC_1$ and location 4 to $DC_2$;

combination 2: associating locations 1, 3 to $DC_1$ and locations 2, 4 to $DC_2$;

combination 3: associating locations 1, 2, 3 to $DC_1$ and location 4 to $DC_3$;

combination 4: associating locations 2, 3 to $DC_1$ and locations 1, 4 to $DC_3$;

combination 5: associating locations 1, 3 to $DC_1$, location 2 to $DC_2$ and location 4 to $DC_3$;

combination 6: associating location 3 to $DC_1$, location 2 to $DC_2$ and locations 1, 4 to $DC_3$;

combination 7: associating locations 2, 3 to $DC_1$, location 4 to $DC_2$ and location 1 to $DC_3$; and combination 8: associating location 3 to $DC_1$, locations 2, 4 to $DC_2$ and location 1 to $DC_3$ Total costs for deploying the application in any of the of these combinations are:

$TC_1$ (combination 1): $FC_1+TUC_{loc\{1,2,3\},1}+FC_2+TUC_{loc\{4\},2}=25+400+30+80=535$;

$TC_2$ (combination 2): $FC_1+TUC_{loc\{1,3\},1}+FC_2+TUC_{loc\{2,4\},2}=25+300+30+160=515$;

$TC_3$ (combination 3): $FC_1+TUC_{loc\{1,2,3\},1}+FC_2+TUC_{loc\{4\},3}=25+400+20+120=565$;

$TC_4$ (combination 4): $FC_1+TUC_{loc\{2,3\},1}+FC_2+TUC_{loc\{1,4\},3}=25+150+20+420=615$;

$TC_5$ (combination 5): $FC_1+TUC_{loc\{1,3\},1}+FC_2+TUC_{loc\{2\},2}+FC_3+TUC_{loc\{4\},3}=25+300+30+80+20+120=575$;

$TC_6$ (combination 6): $FC_1+TUC_{loc\{3\},1}+FC_2+TUC_{loc\{2\},2}+FC_3+TUC_{loc\{1,4\},3}=25+50+30+80+20+420=625$;

$TC_7$ (combination 7): $FC_1+TUC_{loc\{2,3\},1}+FC_2+TUC_{loc\{4\},2}+FC_3+TUC_{loc\{1\},3}=25+150+30+80+20+300=605$; and $TC_8$ (combination 8): $FC_1+TUC_{loc\{3\},1}+FC_2+TUC_{loc\{2,4\},2}+FC_3+TUC_{loc\{1\},3}=25+50+30+160+20+300=585$ Thus, the second combination should be selected and the application should be deployed in datacenters $DC_1$ and $DC_2$, where $DC_1$ serves requests from locations 1 and 3 and $DC_2$ handles requests from locations 2 and 4.

It should be apparent to a person skilled in the art that the method described herein provides the best cost to serve the acceptable SLA guarantee for all users. However, a person skilled in the art can adapt the method to offer a different decision formula, based on different considerations of a datacenter's capacity (e.g., computation resources, storage resources, bandwidth resources, etc.), redirection capacity (e.g., concurrent connections, new connections per second, etc.), response time to users (e.g., average, peak and variance of response time measurements, etc.), application networking quality (e.g., retransmissions and packet loss rate, etc.), operation cost (e.g., fixed and per-usage), operation preference, and operation complexity.

As an example, based on the above teachings a method that weighs the reduction of maximal response time compared to the additional cost associated with such optimization may be utilized to decide on implementing the application in a more costly deployment given a reduction in the maximal SLA. As another example, a method can be defined to optimize the cost for offering the SLA guarantee to at least 98% of the users, allowing 2% of the users to get service lower than the required SLA. Yet another example is an optimization method that divides the application's requests received from a certain client location between multiple datacenters. Such a method would handle the case where a certain location generates more traffic than a low-cost data center can serve, but still utilize the capacity of a low cost datacenter. Another method that can be provided based on the above teachings includes performing the association calculation with limiting the associated location weights on each datacenter to no more than 75% of the datacenter capacity. It should be noted that the exemplary percentages mentioned above are configurable based on the decision that should be provided by a specific method.

The process for efficient deployment of applications in a multi-datacenter system may be triggered by various events. Such events may include an administrator looking to optimize the cost and guarantee SLA at a certain time when the administrator assumes that the loads of clients from different locations have changed. The process may also be triggered by changes in costs at a certain datacenter, or in the capacity of a datacenter. The operator may wish to look for alternative datacenters that can, for example, cut costs and provide similar SLA. The process can be triggered due to changes in the web application, for example, an improvement in the database that significantly reduces STT, can result in a completely different deployment suggestion. Alternatively, the mechanism may operate continuously, monitoring the application and providing optimization suggestions whenever a price threshold is reached.

When the datacenters host a large number of web applications, the process can be modified to consider the shared datacenters resources for the multiple served web applications and is not limited to guarantee the SLA of a single application.

Portions of the invention described herein reference a specific embodiment where the usage cost and fixed cost are used in the optimization process. Other embodiments would be apparent to one of ordinary skill in the art. Specifically, a person skilled in the art can easily adapt the above teaching to provide a process for optimizing a multi-datacenter system to guarantee an acceptable SLA, QoS, and QoE without factoring the monetary costs, but using other factors to weigh application deployment in a datacenter and weigh the proportional allocation of resources in these datacenters.

The foregoing detailed description has set forth a few of the many forms that the invention can take. It is intended that the foregoing detailed description be understood as an illustration of selected forms that the invention can take and not as a limitation to the definition of the invention.

Most preferably, the principles of the invention are implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What we claim is:

1. A system for computing an optimal deployment of at least one web application in a multi-datacenter system, comprising:
a collector for collecting performance measurements with regard to a web application executed in the multi-datacenter system and grouping the performance measurements according to locations of a plurality of clients accessing the web application;
a data repository for maintaining at least a performance table including at least the performance measurements grouped according to the plurality of client locations, the data repository further including a service level agreement (SLA) guaranteed to clients in the plurality of client locations, the performance table lists the plurality of client locations and datacenters in the multi-datacenter system, wherein the performance table includes for each pair of a datacenter and a client location at least a projected transaction time (TT) and for each client location a guaranteed SLA to clients in the client location and a dynamic weight (W) determined based on a load generated by clients in the client location, the performance table designates for each datacenter at least a maximum capacity (MC) variable defining a maximum capacity for at least one of: computation resources, available memory and storage, and available bandwidth of the datacenter, wherein the projected TT is derived based on measured server transaction time (STT) and round-trip time (RTT); and an analyzer for processing at least information stored in the performance table for generating a recommendation on an optimal deployment of the web application in at least one combination of datacenters in the multi-datacenter system by computing an expected SLA that can be guaranteed to the clients in each combination of datacenters, wherein the recommendation on the optimal deployment is generated when the computed expected SLA satisfies the SLA guaranteed to the clients.

2. The system of claim 1, wherein the data repository further includes monetary costs associated with hosting the web application in one or more datacenters of the multi-datacenter system, and wherein the recommendation on the optimal deployment further satisfies a minimized monetary cost.

3. The system of claim 2, wherein the monetary costs include at least a fixed cost (FC) and a usage cost (UC) set for each datacenter in the multi-datacenter system, wherein the fixed cost is associated with starting and maintaining the web application on each datacenter of the multi-datacenter system, the usage cost includes the cost for at least one of: bandwidth usage, computation resource usage, and storage usage at the each datacenter in relation to serving multiple clients of the web application.

4. The system of claim 1, further includes a configuration unit for determining if the multi-datacenter system should be reconfigured based on the recommendation; and configuring the multi-datacenter system to the optimal deployment.

5. The system of claim 1, wherein the performance measurements include at least one of: round-trip time (RTT) measurements, transaction time (TT) measurements, relative load generated by the clients in each client location of the plurality of client locations, aggregated load of transactions generated by the clients in the plurality of client locations, and location information associated with a client location.

6. The system of claim 5, wherein the client location is any one of: a geographical region and a range of network addresses.

7. The system of claim 5, wherein the expected SLA of the clients is computed based on TT measurements measured with respect to a combination of datacenters currently hosting the web application and projected TT values respective to the client location and at least one other datacenter not currently hosting the web application.

8. The system of claim 7, wherein the STT value indicates an application response time in the combination of datacenters currently hosting the web application and the RTT is measured between a client in the client location and the at least one other datacenter.

9. The system of claim 8, wherein the performance table further includes a usability indicator (UI) computed for a pair of a client location and a datacenter determines if the guaranteed SLA associated with the client location can be supported by the datacenter, wherein the usability indicator (UI) is computed based on the guaranteed SLA for the client location and the expected SLA value.

10. The system of claim 9, wherein the performance table further contains for each datacenter a fixed cost and a usage cost set for the datacenter.

11. The system of claim 10, wherein the recommendation is generated based on at least one of: the computed usability indicator (UI) value and the dynamic weight (W) value of each location and the fixed cost (FC), the usage cost (UC), and the maximum capacity (MC) variable associated with each datacenter.

12. The system of claim 10, wherein generating the recommendation further comprising:

processing the information in the performance table to detect possible combinations for associating each of the plurality of client locations with one of the datacenters such that its computed usability indicator (UI) value indicates that the datacenter can support the SLA guaranteed to clients in the client location;

for each such combination:
aggregating for each datacenter in the combination the dynamic weights (W) of all client locations associated with the datacenter;
removing the combination if the aggregated dynamic weights (W) for the datacenter is above any one of the maximum capacity (MC) variable and a redirection capacity (RC) variable defined for the datacenter; and
selecting one of the remaining combinations as an optimal combination of datacenters to deploy the web application, thereby determining the optimal deployment for the web application.

13. The system of claim 10, wherein generating the recommendation further comprising:

processing the information in the performance table to detect possible combinations for associating each of the plurality of client locations with one of the datacenters such that its computed usability indicator (UI) value indicates that the datacenter can support the SLA guaranteed to the client location;

for each such combination:
aggregating for each datacenter in the combination the dynamic weights (W) of all client locations associated with the datacenter;
removing the combination if the aggregated dynamic weights (W) for the datacenter is above any one of the maximum capacity (MC) variable and a redirection capacity (RC) variable defined for the datacenter;
computing a total usage cost (TUC) of the combination;
computing a total cost (TC) of the combination; and
selecting a combination out of the remaining combinations that results in a lowest total cost (TC) as an optimal combination of datacenters to deploy the web application, thereby determining the optimal deployment for the web application.

14. The system of claim 13, wherein a total usage cost (TUC) of the combination is the multiplication of the usage cost (UC) of each datacenter in the combination by the aggregated dynamic weights (W) of client locations that are associated with the datacenter, aggregated across all the datacenters.

15. The system of claim 14, wherein a total cost (TC) of the combination is a sum of the fixed cost (FC) of each datacenter in the combination and the TUC of the combination.

16. The system claim of 8, wherein the performance table further includes for each pair of a datacenter and a client location at least one of: a retransmission rate (R) variable and a variance (V) variable measured from the client location to the datacenter, wherein the retransmission rate (R) variable and variance (V) variable are associated with the RTT measurements.

17. The system of claim 8, wherein the performance table further contains for each datacenter at least one of: a redirection capacity (RC) variable and a preference coefficient (PC) variable, wherein the preference coefficient (PC) variable indicates a general preference for using a particular datacenter, and the redirection capacity (RC) variable defines redirection capabilities of the datacenter in terms of at least one of: an available bandwidth, concurrent connections, and a number of transactions per second.

18. The system of claim 5, wherein the RTT measurements are collected by one or more probing modules installed in one or more datacenters capable of hosting the web application, and the TT measurements are collected by one or more measuring modules installed at least at a datacenter currently hosting the web application.

19. The system of claim 18, wherein the one or more measuring modules and the one or more probing modules are integrated in the system.

20. The system of claim 1, wherein the recommendation further includes at least one of: a list of computing resources that should be allocated or deallocated from a combination of datacenters hosting the web application, deploying the web application in a new combination of datacenters, and removing the web application from a combination of datacenters currently hosting the web application.

21. The system of claim 1, wherein the generation of the recommendation is initiated by the analyzer upon at least one: a command by a system administrator, when the performance measurements stored in the performance table reach a predefined threshold, and at predefined time intervals.

22. The system of claim 1, wherein the multi-datacenter system hosts multiple web applications with a guaranteed SLA to clients for each web application, wherein the analyzer recommends on an optimal deployment of the multiple web applications across the multi-datacenter system, such that the recommended optimal deployment satisfies the guaranteed SLA for each of the multiple web applications.

23. A method for computing an optimal deployment of at least one web application in a multi-datacenter system, comprising:
collecting performance measurements with regard to a web application executed in the multi-datacenter system;
grouping the performance measurements according to locations of a plurality of clients accessing the web application;
maintaining in a data repository at least a performance table including at least the performance measurements grouped according to the plurality of client locations, the performance table further includes a service level agreement (SLA) guaranteed to clients in the plurality of client locations, the performance table lists the plurality of client locations and datacenters in the multi-datacenter system, wherein the performance table includes for each pair of a datacenter and a client location at least a projected transaction time (TT) and for each client location a guaranteed SLA to clients in the client location and a dynamic weight (W) determined based on load generated by clients in the client location, the performance table designates for each datacenter at least a maximum capacity (MC) variable defining a maximum capacity for at least one of: computation resources, available memory and storage, and available bandwidth of the datacenter, wherein the projected TT is derived based on measured server transaction time (STT) and round-trip time (RTT);
computing using information stored in the performance table an expected SLA that can be guaranteed to the clients in each combination of datacenters; and
generating a recommendation on an optimal deployment of the web application in at least one combination of datacenters in the multi-datacenter system based in part on the computed expected SLA, wherein the recommendation on the optimal deployment is generated when the computed expected SLA satisfies the SLA guaranteed to the clients.

24. The method of claim 23, further comprises:
maintaining in the data repository monetary costs associated with hosting the web application in one or more datacenters of the multi-datacenter system, and wherein the recommendation on the optimal deployment further satisfies a minimized monetary cost.

25. The method of claim 24, wherein the monetary costs include at least a fixed cost (FC) and a usage cost (UC) set for each datacenter in the multi-datacenter system, wherein the fixed cost is associated with starting and maintaining the web application on each datacenter of the multi-datacenter system, the usage cost includes the cost for at least one of: bandwidth usage, computation resource usage, and storage usage at the each datacenter in relation to serving multiple clients of the web application.

26. The method of claim 23, further comprising:
determining if the multi-datacenter system should be reconfigured based on the recommendation; and
configuring the multi-datacenter system to the optimal deployment.

27. The method of claim 23, wherein the performance measurements include at least one of: round-trip time (RTT) measurements, transaction time (TT) measurements, relative load generated by the clients in each client location of the plurality of client locations, aggregated load of transactions generated by the clients in the plurality of client locations, and location information associated with a client location.

28. The method of claim 27, wherein the expected SLA of the clients is computed based on TT measurements measured with respect to a combination of datacenters currently hosting the web application and projected TT values respective to the client location and at least one other datacenter not currently hosting the web application.

29. The method of claim 28, wherein the STT value indicates an application response time in the combination of datacenters currently hosting the web application and the RTT is measured between a client in the client location and the at least one other datacenter.

30. The method of claim 29, wherein the performance table further includes a usability indicator (UI) computed for a pair of a client location and a datacenter determines if the guaranteed SLA associated with the client location can be supported by the datacenter, wherein the usability indicator (UI) is computed based on the guaranteed SLA for the client location and the expected SLA value.

31. The method of claim 30, wherein the performance table further contains for each datacenter a fixed cost and a usage cost set for the datacenter.

32. The method of claim 31, wherein the recommendation is generated based on at least one of: the computed usability indicator (UI) value and the dynamic weight (W) value of each location and the fixed cost (FC), the usage cost (UC), and the maximum capacity (MC) value associated with each datacenter.

33. The method of claim 31, wherein generating the recommendations further comprising:
processing the information in the performance table to detect possible combinations for associating each of the plurality of client locations with one of the datacenters such that its computed usability indicator (UI) value indicates that the datacenter can support the SLA guaranteed to clients in the client location;

for each such combination:
  aggregating for each datacenter in the combination the dynamic weights (W) of all client locations associated with the datacenter;
  removing the combination if the aggregated dynamic weights (W) for the datacenter is above any one of the maximum capacity (MC) variable and a redirection capacity (RC) variable defined for the datacenter; and
  selecting one of the remaining combinations as an optimal combination of datacenters to deploy the web application, thereby determining the optimal deployment for the web application.

34. The method of claim 31, wherein generating the recommendation further comprising:
  processing the information in the performance table to detect possible combinations for associating each of the plurality of client locations with one of the datacenters such that its computed usability indicator (UI) value indicates that the datacenter can support the SLA guaranteed to the client location;
  for each such combination:
    aggregating for each datacenter in the combination the dynamic weights (W) of all client locations associated with the datacenter;
    removing the combination if the aggregated dynamic weights (W) for the datacenter is above any one of the maximum capacity (MC) variable and a redirection capacity (RC) variable defined for the datacenter;
    computing a total usage cost (TUC) of the combination;
    computing a total cost (TC) of the combination; and
    selecting a combination out of the remaining combinations that results in a lowest total cost (TC) as an optimal combination of datacenters to deploy the web application, thereby determining the optimal deployment for the web application.

35. The method of claim 34, wherein a total usage cost (TUC) of the combination is the multiplication of the usage cost (UC) of each datacenter in the combination by the aggregated dynamic weights (W) of client locations that are associated with the datacenter, aggregated across all the datacenters.

36. The method claim of 29, wherein the performance table further includes for each pair of a datacenter and a client location at least one of: a retransmission rate (R) variable and a variance (V) variable measured from the client location to the datacenter, wherein the retransmission rate (R) variable and variance (V) variable are associated with the RTT measurements.

37. The method of claim 29, wherein the performance table further contains for each datacenter at least one of: a redirection capacity (RC) variable and a preference coefficient (PC) variable, wherein the preference coefficient (PC) variable indicates a general preference for using a particular datacenter, and the redirection capacity (RC) variable defines redirection capabilities of the datacenter in terms of at least one of: an available bandwidth, concurrent connections, and a number of transactions per second.

38. The method of claim 23, wherein the recommendations further include at least one of: a list of computing resources that should be allocated or deallocated from a combination of datacenters hosting the web application, deploying the web application in a new combination of datacenters, and removing the web application from a combination of datacenters currently hosting the web application.

39. The method of claim 38, wherein a total cost (TC) of the combination is a sum of the fixed cost (FC) of each datacenter in the combination and the TUC of the combination.

40. The method of claim 23, wherein generating the recommendation is initiated by upon at least one: a command by a system administrator, when the performance measurements stored in the performance table reach a predefined threshold, and at predefined time intervals.

41. The method of claim 23, wherein the multi-datacenter system hosts multiple web applications with a guaranteed SLA of clients set for each web application, wherein the recommendation is generated for an optimal deployment of the multiple web applications across the multi-datacenter system, such that the recommended optimal deployment satisfies the guaranteed SLA for each of the multiple web applications.

42. A non-transitory computer readable medium having stored thereon instructions for causing one or more processing units to execute the method according to claim 23.

* * * * *